(12) United States Patent
Bonanomi et al.

(10) Patent No.: US 11,255,870 B2
(45) Date of Patent: Feb. 22, 2022

(54) GEL AND POLYMER BASED FLOW METERS

(71) Applicant: CALIFORNIA INSTITUTE OF TECHNOLOGY, Pasadena, CA (US)

(72) Inventors: Luca Bonanomi, Pasadena, CA (US); Vincenzo Costanza, Pasadena, CA (US); Chiara Daraio, Pasadena, CA (US); Giovanni Moscato, Pasadena, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 131 days.

(21) Appl. No.: 16/404,586

(22) Filed: May 6, 2019

(65) Prior Publication Data
US 2019/0339298 A1    Nov. 7, 2019

Related U.S. Application Data

(60) Provisional application No. 62/667,742, filed on May 7, 2018.

(51) Int. Cl.
| | | |
|---|---|---|
| *G01P 5/10* | (2006.01) | |
| *G01F 1/688* | (2006.01) | |
| *G01P 5/12* | (2006.01) | |

(52) U.S. Cl.
CPC .............. *G01P 5/10* (2013.01); *G01F 1/688* (2013.01); *G01P 5/12* (2013.01)

(58) Field of Classification Search
CPC ......... G01P 5/10; G01P 5/12; G01F 1/68–699
See application file for complete search history.

(56) References Cited

U.S. PATENT DOCUMENTS

| | | | |
|---|---|---|---|
| 4,283,944 A * | 8/1981 | Gruner ................... | G01F 1/698 73/204.19 |
| 5,186,051 A | 2/1993 | Stecher et al. | |
| 5,834,776 A | 11/1998 | Beratan et al. | |
| 6,497,902 B1 | 12/2002 | Ma | |
| 8,069,718 B2 | 12/2011 | Nakano et al. | |
| 9,243,943 B2 | 1/2016 | Moore et al. | |
| 9,274,004 B2 | 3/2016 | Yonemura et al. | |
| 10,345,153 B2 | 7/2019 | Daraio et al. | |

(Continued)

FOREIGN PATENT DOCUMENTS

| | | |
|---|---|---|
| CN | 104075813 A | 10/2014 |
| CN | 107690571 A | 2/2018 |

(Continued)

OTHER PUBLICATIONS

Alamusi et al. "Temperature-dependent piezoresistivity in an MWCNT/epoxy nanocomposite temperature sensor with ultrahigh performance" *Nanotechnology, IOP Publishing.*2013. vol. 24. 455501. 6 pages.

(Continued)

*Primary Examiner* — Justin N Olamit
(74) *Attorney, Agent, or Firm* — Steinfl + Bruno LLP (57) ABSTRACT

A sensor includes a heater, a thermal insulator between two thermometer layers, the heater generating a thermal gradient within the thermal insulator. The thermometers give an indirect measurement of fluid flow around the sensor, based on their temperature readings. The thermometers are flexible layers including gels.

10 Claims, 5 Drawing Sheets

(56) References Cited

U.S. PATENT DOCUMENTS

| | | |
|---|---|---|
| 2007/0295907 A1 | 12/2007 | Brott et al. |
| 2010/0239621 A1 | 9/2010 | Tsujihata |
| 2013/0269781 A1 | 10/2013 | Ko et al. |
| 2013/0279538 A1 | 10/2013 | Beratan et al. |
| 2014/0105242 A1 | 4/2014 | Fernandes et al. |
| 2016/0178553 A1 | 6/2016 | Bommarito et al. |
| 2018/0038722 A1 | 2/2018 | Ozaki et al. |
| 2018/0080830 A1 | 3/2018 | Daraio et al. |
| 2019/0271597 A1 | 9/2019 | Daraio et al. |
| 2019/0284349 A1 | 9/2019 | Bassett et al. |

FOREIGN PATENT DOCUMENTS

| | | |
|---|---|---|
| EP | 3073235 A1 | 9/2016 |
| EP | 3274677 A1 | 1/2018 |
| KR | 20170110664 A | 10/2017 |
| WO | 03/050522 A1 | 6/2003 |
| WO | 2016/151110 A1 | 9/2016 |

OTHER PUBLICATIONS

Balberg, I. "Tunneling and Nonuniversal Conductivity in Composite Materials" *Physical Review Letters, The American Physical Society*. Sep. 21, 1987. vol. 59, No. 12. pp. 1305-1308. 4 pages.

Bockrath et al. "Luttinger-liquid behavior in carbon nanotubes" *Nature, Macmillan Magazines Ltd*. Feb. 18, 1999. vol. 397. pp. 598-601. 4 pages.

Caffall et al. "The structure, function, and biosynthesis of plant cell wall pectic polysaccharides" *Carbohydrate Research, Elsevier*. 2009. vol. 344. pp. 1879-1900. 22 pages.

Cardoso et al. "Temperature dependence of the formation and melting of pectin-Ca 2+ networks: A rheological study" *Food Hydrocolloids, Elsevier*.2003. vol. 17. pp. 801-807. 8 pages.

Choi et al. "Solvatochromism in single-walled carbon nanotubes" *Applied Physics Letters, American Institute of Physics*.2007. vol. 90, No. 223114. pp. 223114-1-223114-3. 4 pages.

Cifuentes et al. "Biosynthesis of Callose and Cellulose by Detergent Extracts of Tobacco Cell Membranes and Quantification of the Polymers Synthesized in vitro" *Journal of Integrative Plant Biology, Chinese Academy of Sciences—Institute of Botany*.2010. vol. 52, No. 2. pp. 221-233. 13 pages.

Di Giacomo et al. "Bio-Nano-Composite Materials Constructed With Single Cells and Carbon Nanotubes: Mechanical, Electrical, and Optical Properties" *IEEE Transactions on Nanotechnology, Institute of Electrical and Electronics Engineers*. Nov. 2013. vol. 12, No. 6. pp. 1026-1030. 5 pages.

Di Giacomo et al. "Candida albicans/MWCNTs: a Stable Conductive Bio-Nano-Composite and its Temperature Sensing Properties" *IEEE Transactions on Nanotechnology, Institute of Electrical and Electronics Engineers*. Mar. 2013. vol. 12, No. 2. pp. 111-114. 4 pages.

Di Giacomo et al. "Investigation of multiwalled carbon nanotube interconnection geometry and electrical characteristics of an CNT-filled aluminum microgap" *Canadian Journal of Physics, National Research Council Research Press*. 2014. vol. 92. pp. 827-831. 5 pages.

Di Giacomo et al. "Plant nanobionic materials with a giant temperature response mediated by pectin-CA2+" *Proceedings of the National Academy of Sciences of the United States of America, National Academy of Sciences*. Apr. 14, 2015. vol. 112, No. 15. pp. 4541-4545. 5 pages.

European Search Report for EP Application No. EP15195729 filed on behalf of California Institute of Technology, dated Jul. 20, 2016. 1 Page.

Fensom, D.S. "A Note on Electrical Resistance Measurements in Acer Saccharum" *Canadian Journal of Botany, NRC Research Press*. 1960. vol. 38, No. 2. pp. 263-265. 5 pages.

Fensom, D.S. "On Measuring Electrical Resistance in Situ in Higher Plants" *Canadian Journal of Plant Science, Agricultural Institute of Canada*. Mar. 1966. vol. 46. pp. 169-175. 7 pages.

Fernandes et al. "Nanostructure of cellulose microfibrils in spruce wood" *Proceedings of the National Academy of Sciences, National Academy of Sciences*. Nov. 22, 2011. vol. 108, No. 47. pp. E1195-E1203. 9 pages.

First Chinese OA for Application No. 201680030032.3 filed Mar. 24, 2016 in the name of California Institute of Technology, dated Jan. 22, 2019. 22 pgs. Chinese and English.

Giraldo et al. "Plant nanobionics approach to augment photosynthesis and biochemical sensing" *Nature Materials, Nature Publishing Group*. Apr. 2014. vol. 13, No. 2. pp. 400-408. 10 pages.

Guerette et al. "Accelerating the design of biomimetic materials by integrating RNA-seq with proteomics and materials science" Nature Biotechnology, Nature America Inc. Oct. 2013. vol. 31, No. 10. pp. 908-915. 11 pages.

Han et al. "Carbon Nanotube Based Humidity Sensor on Cellulose Paper" *The Journal of Physical Chemistry C, American Chemical Society*.2012. vol. 116. pp. 22094-22097. 5 pages.

Hu et al. "Localization of Boron in Cell Walls of Sguash and Tobacco and Its Association with Pectin—Evidence for a Structural Role of Boron in the Cell Wall" *Plant Physiology, American Society of Plant Biologists*.1994. vol. 105. pp. 681-689. 9 pages.

International Preliminary Report on Patentability for International Application No. PCT/EP2016/056642 filed on Mar. 24, 2016 on behalf of Eth Zürich, dated Sep. 26, 2017. 7 Pages.

International Search Report and Written Opinion for International Application No. PCT/US2019/030941 filed on May 6, 2019 on behalf of California Institute of Technology, dated Aug. 23, 2019. 11 Pages.

International Search Report for International Application No. PCT/EP2016/056642, filed on Mar. 24, 2016, on behalf of Eth Zurich, dated Jun. 27, 2016. 3 pages.

Itkis et al. "Bolometric Infrared Photoresponse of Suspended Single-Walled Carbon Nanotube Films" *Science, American Association for the Advancement of Science*. Apr. 21, 2006. vol. 312. pp. 413-416. 5 pages.

Itkis et al. "Thermal Conductivity Measurements of Semitransparent Single-Walled Carbon Nanotube Films by a Bolometric Technique" *Nano Letters, American Chemical Society*.2007. vol. 7, No. 4. pp. 900-904. 5 pages.

Kaltenbrunner et al. "An ultra-lightweight design for imperceptible plastic electronics" *Nature, Nature Publishing Group*. Jul. 25, 2013. vol. 499. pp. 458-463. 9 pages.

Kamaya et al. "A lithium superionic conductor" *Nature Materials, Macmillan Publishers Ltd*. Sep. 2011. vol. 10. pp. 682-686. 5 pages.

Keplinger et al. "Stretchable, Transparent, Ionic Conductors" *Science, American Association for the Advancement of Science*. Aug. 30, 2013. vol. 341. pp. 984-987. 5 pages.

Kim et al. "Stretchable silicon nanoribbon electronics for skin prosthesis" *Nature Communications, Macmillan Publishers Ltd*. Dec. 9, 2014. vol. 5, No. 5747. pp. 1-11. 11 pages.

Leslie et al. "A bioinspired omniphobic surface coating on medical devices prevents thrombosis and biofouling" *Nature Biotechnology, Nature America Inc*. Nov. 2014. vol. 32, No. 11. pp. 1134-1140. 10 pages.

Li et al. "Continuum percolation of nanocomposites with fillers of arbitrary shapes" *Applied Physics Letters, American Institute of Physics Publishing*. 2007. vol. 90, No. 174108. pp. 174108-1-174108-3 . 4 pages.

Li et al. "Direct Measurements of Interactions between Polypeptides and Carbon Nanotubes" *Journal of Physical Chemistry B, American Chemical Society*. 2006. vol. 110, No. 25. pp. 12621-12625. 5 pages.

Li et al. "Dominant role of tunneling resistance in the electrical conductivity of carbon nanotube-based composites" *Applied Physics Letters, American Institute of Physics*. 2007. vol. 91. pp. 223114-1-223114-3. 4 pages.

Matthews et al. "High-Temperature Behavior of Cellulose I" *The Journal of Physical Chemistry B, American Chemical Society*. 2011. vol. 115. pp. 2155-2166. 12 pages.

(56) References Cited

OTHER PUBLICATIONS

McCrudden et al. "Microneedle applications in improving skin appearance" *Experimental Dermatology, John Wiley & Sons Ltd.* 2015. vol. 24. pp. 561-566. 6 pages.

Miguel et al. "Thermoresponsive chitosan-agarose hydrogel for skin regeneration" *Carbohydrate Polymers, Elsevier.* 2014. vol. 111. pp. 366-373. 9 pages.

Nadel et al. "Differential Thermal Sensitivity in the Human Skin" *Pflugers Archive—European Journal of Physiology,* Springer-Verlag. 1973. vol. 340. pp. 71-76. 7 pages.

Narayan et al. "Phase transition and critical issues in structure-property correlations of vanadium oxide" *Journal of Applied Physics, American Institute of Physics.* 2006. vol. 100. pp. 103524-1-103524-6. 7 pages.

Nawroth et al. "A tissue-engineered jellyfish with biomimetic propulsion" *Nature Biotechnology, Nature Publishing Group.* Aug. 2012. vol. 30, No. 8. pp. 792-797. 20 pages.

Neitzert et al. "Epoxy/MWCNT Composite as Temperature Sensor and Electrical Heating Element" *IEEE Transactions on Nanotechnology, Institute of Electrical and Electronics Engineers.* Jul. 2011. vol. 10, No. 4. pp. 688-693. 6 pages.

Nilsson et al. "Conductivity Percolation in Loosely Compacted Microcrystalline Cellulose: An in Situ Study by Dielectric Spectroscopy during Densification" *The Journal of Physical Chemistry B, American Chemical Society.* 2006. vol. 110. pp. 20502-20506. 5 pages.

Nilsson et al. "Mesopore Structure of Microcrystalline Cellulose Tablets Characterized by Nitrogen Adsorption and SEM: The Influence on Water-Induced Ionic Conduction" *Journal of Physical Chemistry B, American Chemical Society.* 2006. vol. 110. pp. 15776-15781. 6 pages.

Nilsson et al. "Water-induced charge transport in tablets of microcrystalline cellulose of varying density: dielectric spectroscopy and transient current measurements" *Chemical Physics, Elsevier.* 2003. vol. 295. pp. 159-165. 7 pages.

Non-Final Office Action for U.S. Appl. No. 15/560,971, filed Sep. 22, 2017, on behalf of California Institute of Technology, dated Jun. 20, 2018. 9 pages.

Notice of Allowance for U.S. Appl. No. 15/560,971, filed Sep. 22, 2017, on behalf of California Institute of Technology, dated Nov. 13, 2018. 10 pages.

Notice of Allowance for U.S. Appl. No. 15/560,971, filed Sep. 22, 2017 on behalf of California Institute of Technology, dated Feb. 22, 2019. 11 pages.

Peaucelle et al. "Cell wall mechanics and growth control in plants: the role of pectins revisited" *Frontiers in Plant Science, Frontiers Media.* Jun. 2012. vol. 3, No. 121. pp. 1-6. 6 pages.

Plazinski et al. "Molecular Basis of Calcium Binding by Polyguluronate Chains. Revising the Egg-Box Model" *Journal of Computational Chemistry, Wiley Periodicals Inc.* 2011. vol. 32. pp. 2988-2995. 8 pages.

Qi et al. "Unique water sensors based on carbon nanotube-cellulose composites" *Sensors and Actuators B: Chemical, Elsevier.* 2013. vol. 185. pp. 225-230. 6 pages.

Saha et al. "Hydrocolloids as thickening and gelling agents in food: a critical review" *Journal of Food Science and Technology, Springer.* Nov.-Dec. 2010. vol. 47, No. 6. pp. 587-597. 11 pages.

Second Chinese OA for Application No. 201680030032.3 filed Mar. 24, 2016 in the name of California Institute of Technology, dated Jul. 5, 2019. 12 Pages. Original + Partial English Translation.

Segev-Bar et al. "Tunable Touch Sensor and Combined Sensing Platform: Toward Nanoparticle-based Electronic Skin" *Applied Materials and Interfaces, American Chemical Society.* 2013. vol. 5. 5531-5541. 20 pages.

Sheng, Ping. "Flactuation-induced tunneling conduction in disordered materials" *Physical Review B, The American Physical Society.* Mar. 15, 1980. vol. 21, No. 6. pp. 2180-2195. 16 pages.

Simmons, John G. "Generalized Formula for the Electric Tunnel Effect between Similar Electrodes Separated by a Thin Insulating Film" *Journal of Applied Physics, American Institute of Physics.* Jun. 1963. vol. 34, No. 6. pp. 1793-1803. 11 pages.

Sriamornsak, Pornsak. "Chemistry of Pectin and Its Pharmaceutical Uses: A Review" *SUIC International Journal, Silpakorn University International College.* 2003. vol. 3. pp. 206-228. 23 pages.

Stapleton et al. "Silicone Hydrogel Contact Lenses and the Ocular Surface" *The Ocular Surface, Elsevier.* Jan. 2006. vol. 4, No. 1. pp. 24-43. 20 pages.

Sun et al. "Ionic Skin" *Advanced Materials, Wiley-VCH Verlag GmbH & Co.* 2014. vol. 26. pp. 7608-7614. 7 pages.

Syllaios et al. "Amorphous Silicon Microbolometer Technology" *Materials Research Society Symposium Proceedings, Materials Research Society.* 2000. vol. 609. pp. A14.4.1-A14.4.6. 8 pages.

Tan et al. "Studies on toxicity of multi-walled carbon nanotubes on suspension rice cells" *Carbon, Elsevier.* 2009. vol. 47. pp. 3479-3487. 9 pages.

Tee et al. "An electrically and mechanically self-healing composite with pressure- and flexion-sensitive properties for electronic skin applications" *Nature Nanotechnology, Macmillan Publishers Ltd.* Dec. 2012. vol. 7. pp. 825-832. 8 pages.

Thomas et al. "Structure of Cellulose Microfibrils in Primary Cell Walls from Collenchyma" *Plant Physiology, American Society of Plant Biologists.* Jan. 2013. vol. 161. pp. 465-476. 12 pages.

Van Buren, J.P. "Chapter 1: Function of Pectin in Plant Tissue Structure and Firmness" *The Chemistry and Technology of Pectin, Academic Press Inc.* 1991. pp. 1-23. 15 pages.

Vay et al. "The thermo-TRP ion channel family: Properties and therapeutic implications" *British Journal of Pharmacology, The British Pharmacological Society.* 2012. vol. 165. pp. 787-801. 16 pages.

Vollmer et al. "Infrared Thermal Imaging: Fundamentals, Research and Applications" *Wiley-VCH Verlag GmbH & Co. KGaA.* 2010. pp. i-593. 611 pages.

Wang et al. "Nanostructured vanadium oxide thin film with high TCR at room temperature for microbolometer" *Infrared Physics & Technology, Elsevier.* 2013. vol. 57. pp. 8-13. 7 pages.

Willats et al. "Pectin: Cell biology and prospects for functional analysis" *Plant Molecular Biology, Kluwer Academic Publishers.* 2001. vol. 47. pp. 9-27. 20 pages.

Wilson, Mark. "Giant impacts may explain the origin of chondrules" *Physics Today, American Institute of Physics.* Mar. 2015. vol. 68, No. 15. pp. 14-17. 5 pages.

Written Opinion for International Application No. PCT/EP2016/056642, filed on Mar. 24, 2016, on behalf of Eth Zurich, dated Jun. 27, 2016. 6 pages.

Hashimoto, T., et al., "Synthesis of Poly(Vinyl ether)-based, ABA Triblock-type Thermoplastic Elastomers with Functional Soft Segments and their Gas Permeability," Journal of Polymer Sci. Part A: Polymer Chem. 53(9); 1114-1124. Feb. 7, 2015.

Hawthorne, D.G., et al., "Living Radical Polymerization with Reversible Addition-Fragmentation Chain Transfer (RAFT): Direct ESR Observation of Intermediate Radicals," Macromolecules 32 (16), 5457-5459. Jul. 22, 1999.

Hayashi, M., et al, "Mechanical Property Enhancement of ABA Block Copolymer-Based Elastomers by Incorporating Transient Cross-Links into Soft Middle Block," Macromolecules 48 (2);421-31. Jan. 8, 2015.

Kang, H. U.; Yu, Y. C.; Shin, S. J.; Youk, J. H. "One-Step Synthesis of Block Copolymers Using a Hydroxyl-Functionalized Trithiocarbonate RAFT Agent as a Dual Initiator for RAFT Polymerization and ROP", Journal of Polymer Science Part A: Polymer Chemistry. 2013, 51, pp. 774-779.

Thang, S.H., et al., "A novel synthesis of functional dithioesters, dithiocarbamates, xanthates and trithiocarbonate" Tetrahedron Lett. 40 (12), 2435-2438. Mar. 19, 1999.

Varshney, S. K., et al., "Synthesis of ABA Type Thermoplastic Elastomers Based on Polyacrylates," Macromolecules 32 (1), 235-37. 1999.

Corrected Notice of Allowability for U.S. Appl. No. 16/418,866, filed May 21, 2019 on behalf of California Institute of Technology, dated Jul. 22, 2020. 2 Pages.

(56) References Cited

OTHER PUBLICATIONS

Non-Final Office Action for U.S. Appl. No. 16/418,866, filed May 21, 2019 on behalf of California Institute of Technology, dated Apr. 2, 2020. 16 Pages.
Notice of Allowance for U.S. Appl. No. 15/466,839, filed May 21, 2019 on behalf of California Institute of Technology, dated Jun. 4, 2020. 8 Pages.
Notification of Intention to Grant for Chinese Application No. 201680030032.3 filed Mar. 24, 2016 in the name of California Institute of Technology, dated Jun. 30, 2020. 4 Pages.
European Office Action for EP Application No. EP16715264.4 filed on behalf of California Institute of Technology, dated Nov. 26, 2019. 5 Pages.
Alessia Lodi, et al., "Physical properties and water state changes during storage in soy bread with and without almond", Food Chemistry, vol. 110, Issue 3, pp. 554-561, (Oct. 2008), DOI: 10.1016/j.foodchem.2008.02.032. Abstract Only.
Alex Chortos et al., "Pursuing prosthetic electronic skin", Nature Materials, vol. 15, No. 9, pp. 937-950, (Jul. 4, 2016) DOI: 10.1038/NMAT4671. Abstract Only.
Andrade,J.R. et al. "Plasticized pectin-based gel electrolytes", Electrochimica Acta, 54, pp. 6479-6483 (2009).
B.P. Mason, et al., "A temperature-mapping molecular sensor for polyurethane-based elastomers", Applied Physics Letters, vol. 108, No. 041906, 4 pages, (Jan. 27, 2016), DOI: 10.1063/1.4940750.
Carlos Garcia Nunez, et al., "Energy-Autonomous, Flexible, and Transparent Tactile Skin", Advanced Functional Materials, vol. 27, No. 1606287, (2017), 12 pages. DOI: 10.1002/adfm.201606287.
Charles W. Walker Jr., et al., "Improvement of Ionic Conductivity in Plasticized PEO-Based Solid Polymer Electrolytes", J. Electrochem. Soc., vol. 140, No. 12, (Dec. 1993), pp. 3409-3412. Abstract Only.
Christoph Keplinger, et al., "Stretchable, Transparent, Ionic Conductors", Science, vol. 341, No. 6149, (Aug. 30, 2013), pp. 984-987, DOI:10.1126/science.1240228.
Cunjiang Yu, et al., "A stretchable temperature sensor based on elastically buckled thin film devices on elastomeric substrates", Applied Physics Letters, vol. 95, No. 141912, (Oct. 8, 2009), DOI: 10.1063/1.3243692. Abstract Only.
Da Silva, M.A., et al. "Alginate and pectin composite films crosslinked with Ca 2+ ions: Effect of the plasticizer concentration", Carbohydrate Polymers, vol. 77, No. 4, pp. 736-742 (Jul. 19, 2009). 16 pages.
Dimitrios Fessas, et al., "Water properties in wheat flour dough I: Classical thermogravimetry approach", Food Chemistry, vol. 72, Issue 2, pp. 237-244, (Feb. 2001). Abstract Only.
Giuseppe Cantarella, et al., "Design of Engineered Elastomeric Substrate for Stretchable Active Devices and Sensors", Advanced Functional Materials; vol. 28, Issue 30, No. 1705132, (Jul. 25, 2018), DOI: 10.1002/adf m.201705132. Abstract Only.
G.K. Prajapati, et al., "Effect of plasticizer on ionic transport and dielectric properties of PVA-H3PO4 proton conducting polymeric electrolytes", Journal of Physics and Chemistry of Solids, vol. 71, pp. 1717-1723, (2010), DOI: 10.1016/j.jpcs.2010.08.023.
G.O. Machado, et al., "Influence of plasticizer contents on the properties of HEC-based solid polymeric electrolytes", Electrochimica Acta, vol. 50 (19), pp. 3827-3831, (Jun. 2005), DOI: 10.1016/j. al ecacta.2005.02.041. Abstract Only.
J. K. Aggarwal et al., "Sensor Data Fusion in Robotic Systems", Control and Dynamic Systems, vol. 39, Part 1, pp. 435-462, (1991). Abstract Only.
Jaemin Kim, et al., "Stretchable silicon nanoribbon electronics for skin prosthesis", Nature Communications, vol. 5, No. 5747, pp. 1-11, (Dec. 9, 2014), DOI: 10.1038/ncomms6747.
Jin-Nam Jeon et al., "Flexible Wireless Temperature Sensors Based on Ni Microparticle-Filled Binary Polymer Composites", Advanced Materials, vol. 25, pp. 850-855, (2013), DOI: 10.1002/adm a.201204082. Abstract Only.
Jonghwa Park, et al., "Fingertip skin-inspired microstructured ferroelectric skins discriminate static/dynamic pressure and temperature stimuli", Nanomaterials, Science Advances. vol. 1, No. 9, el 500661, pp. 1-13, (Oct. 30, 2015). 19 pages.
Jordi Saldo, et al., "Changes in water binding in high-pressure treated cheese, measured by TGA (thermogravimetrical analysis)", Innovative Food Science and Emerging Technologies, vol. 3, pp. 203-207, (2002).
L.R. A. K. Bandara et al., "Ionic conductivity of plasticized (PEO)-LiCF3SO3 electrolytes", Electrochimica Acta, vol. 43, Nos. 10-11, pp. 1447-1451, (1998).
Melissa Gurgel Adeodato Vieira et al., "Natural-based plasticizers and biopolymer films: A review", European Polymer Journal, vol. 47, Issue 3, pp. 254-263. (Mar. 2011), DOI: 10.1016/j. eu rpolymj. 2010.12.011. 27 pages.
Mohammed Aider, "Chitosan application for active bio-based films production and potential in the food industry: Review", LWT—Food Science and Technology, vol. 43, Issue 6, pp. 837-842, (Jul. 2010), DOI: 10.1016/j. lwt.2010.01.021. Abstract Only.
Non-Final Office Action for U.S. Appl. No. 16/935,300, filed Jul. 22, 2020 on behalf of Samsung Electronics Co., Ltd. et al, dated Aug. 13, 2021. 14 pages.
Paula Judith Perez Espitia, et al., "Edible films from pectin: Physical-mechanical and antimicrobial properties—A review", Food Hydrocolloids, vol. 35, pp. 287-296, (Mar. 2014); DOI: 10.1016/j. foodhyd. 2013.06.005. Abstract Only.
Pradeep K. Varshney, et al., "Natural polymer-based electrolytes for electrochemical devices: a review", Ionics, vol. 17, pp. 479-483, (2011), DOI: 10.1007/sl1581-011-0563-1.
Raffaele Di Giacomo, et al., "Biomimetic temperature-sensing layer for artificial skins", Science Robotics, vol. 2, Issue 3, eaai9251, pp. 1-6, (Feb. 1, 2017). Abstract Only.
Rokeya Huq, et al., "Influence of plasticizers on the electrochemical and chemical stability of a Li+ polymer electrolyte", Solid State Ionics, vol. 57, Issues 3-4, pp. 277-283, (1992). Abstract Only.
S. Gao, et al., "Temperature dependence of conductivity enhancement induced by nanoceramic fillers in polymer electrolytes", Applied Physics Letters, vol. 102, No. 173903, (2013), DOI: 10.1063/1.4803185. Abstract Only.
S.D. Pasini Cabello, et al., "Influence of plasticizers in pectin films: Microstructural changes", Materials Chemistry and Physics, vol. 162, pp. 491-497, (Jul. 15, 2015), DOI: 10.1016/j. match emphys. 2015.06.019. Abstract Only.
Siegfried Bauer, "Sophisticated Skin", Flexible Electronics, Nature Materials, vol. 12, pp. 871-872, (Oct. 2013). Abstract Only.
Tomoyuki Yokota, et al., "Ultraflexible, large-area, physiological temperature sensors for multipoint measurements", PNAS, vol. 112, No. 47, pp. 14533-14538, (Nov. 24, 2015), DOI: 10.1073/pn as.1 51 56501 12.
Tran Quang Trung et al., "An All-Elastomeric Transparent and Stretchable Temperature Sensor for Body-Attachable Wearable Electronics", Advanced Materials, vol. 28, Issue3, pp. 502-509, (2016), DOI: 10.1002/adma.201504441. Abstract Only.
Tran Quang Trung et al., "Flexible and Stretchable Physical Sensor Integrated Platforms for Wearable Human Activity Monitoring and Personal Healthcare", Advanced Materials, vol. 28, No. 22, pp. 4338-4372 (2016). Abstract Only.
Vincenzo Costanza, et al., "Effect of glycerol on the mechanical and temperature-sensing properties of pectin films", Applied Physics Letters, vol. 115, No. 193702, (2019), 5 pages. DOI: 10.1063/1.5121710.
Wang Ning, et al., "N, N-dimethylacetamide/lithium chloride plasticized starch as solid biopolymer electrolytes", Carbohydrate Polymers; vol. 77, Issue 3, pp. 607-611, (Jul. 11, 2009), DOI: 10.1016/j.carbpol.2009.02.002. Abstract Only.
Xiandi Wang et al., "Recent Progress in Electronic Skin", Advanced Science, vol. 2, No. 1500169 (2015). 21 pages.
Xinming Qian, et al., "Plasticizer effect on the ionic conductivity of PEO-based polymer electrolyte", Materials Chemistry and Physics, vol. 74, Issue 1, pp. 98-103, (Feb. 2002). Abstract Only.
Yubin Wang, et al., "Measurement of free water in foods by secondary derivative thermogravimetry", CyTA—Journal of Food, vol. 16, No. 1, pp. 438-443, (2018), DOI: 10.1080/19476337.2017.1416675.

(56) References Cited

OTHER PUBLICATIONS

Yuki Masuda, et al., "Study on ionic conductivity of polymer electrolyte plasticized with PEG-aluminate ester for rechargeable lithium ion battery", Solid State Ionics, vol. 177, Issues 9-10, pp. 843-846, (Mar. 2006), DOI:10.1016/j.ssi.2006.01.049. Abstract Only.

Aggarwal, J.K.., et al., "Sensor Data Fusion in Robotic Systems", *Control and Dynamic Systems*, vol. 39, Part 1, pp. 435-462, 1991. 19 Pages.

Aider, M., "Chitosan application foractive bio-based films production and potential in the food industry: Review", LWT -Food Science and Technology, vol. 43, Issue 6, pp. 837-842. Jul. 2010. DOI: 10.1016/j. lwt.2010.01.021. 7 Pages.

Bauer, S., "Sophisticated Skin", Flexible Electronics, Nature Materials, vol. 12, pp. 871-872, Oct. 2013. 3 Pages.

Cabello, S.D.P, et al., "Influence of plasticizers in pectin films: Microstructural changes", Materials Chemistry and Physics, vol. 162, pp. 491-497, Jul. 15, 2015. 8 Pages. DOI: 10.1016/j. matchemphys.2015.06.019.

Cantarella, G., et al., "Design ofEngineered Elastomeric Substrate forStretchable Active Devicesand Sensors", Advanced Functional Materials; vol. 28, Issue 30, No. 1705132, Jul. 25, 2018, 10 Pages. DOI: 10.1002/adf m.201705132.

Chortos, A., et al., "Pursuing prosthetic electronicskin", Nature Materials, vol. 15, No. 9, pp. 937-950, Jul. 4, 2016. 15 Pages. DOI: 10.1038/NMAT4671.

Di Giacomo, R., et al., "Biomimetic temperature-sensing layer for artificial skins", Science Robotics, vol. 2, Issue 3, eaai9251, pp. 1-6, Feb. 1, 2017. 8 Pages.

Fessas, D., et al., "Water properties in wheat flour dough I: Classical thermogravimetry approach", Food Chemistry, vol. 72, Issue 2, pp. 237-244, Feb. 2001. 9 Pages.

Gao, S., et al., "Temperature dependence ofconductivity enhancement induced by nanoceramic fillers in polymer electrolytes", Applied Physics Letters, vol. 102, No. 173903, 2013. 6 Pages. DOI: 10.1063/1.4803185.

Huq, R., et al., "Influence ofplasticizers on the electrochemical and chemical stability of a Li+ polymer electrolyte", Solid State Ionics, vol. 57, Issues 3-4, pp. 277-283, 1992. 8 Pages.

Jeon, J., et al., "Flexible Wireless Temperature Sensors Based on Ni Microparticle-Filled Binary Polymer Composites", Advanced Materials, vol. 25, pp. 850-855, 2013. 7 Pages. DOI: 10.1002/adm a.201204082.

Lodi, A., et al., "Physical properties and water state changes during storage in soy bread with and with out almond", Food Chemistry, vol. 110, Issue 3, pp. 554-561, Oct. 2008. 9 Pages. DOI: 10.1016/ j.foodchem.2008.02.032.

Machado, G.O., et al., "Influence of plasticizer contents on the properties of HEC-based solid polymericelectrolytes", Electrochimica Acta, vol. 50 (19), pp. 3827-3831, Jun. 2005. 6 Pages. DOI: 10.1016/j. al ecacta.2005.02.041.

Masuda, Y., et al., "Study on ionic conductivity of polymer electrolyte plasticized with PEG-aluminate ester for rechargeable lithiumion battery", Solid State Ionics, vol. 177, Issues 9-10, pp. 843-846, Mar. 2006. 5 Pages. DOI:10.1016/j.ssi.2006.01.049.

Ning, W., et al., "N, N-dimethylacetamide/lithium chloride plasticized starch as solid biopolymer electrolytes", Carbohydrate Polymers; vol. 77, Issue 3, pp. 607-611, Jul. 11, 2009. 6 Pages. DOI: 10.1016/i.carbpol.2009.02.002.

Perez Espitia, P.J. et al., "Ediblefilms from pectin: Physical-mechanical and antimicrobial properties-Areview", Food Hydrocolloids, vol. 35, pp. 287-296, Mar. 2014. 11 Pages. DOI: 10.1016/j. foodhyd.2013.06.005.

Qian, X., et al., "Plasticizer effect on the ionic conductivity of PEO-based polymer electrolyte", Materials Chemistry and Physics, vol. 74, Issue 1, pp. 98-103, Feb. 2002. 7 Pages.

Trung, T.Q., et al., "An All-Elastomeric Transparent and Stretchable Temperature Sensor for Body-Attachable Wearable Electronics", Advanced Materials, vol. 28, Issue 3, pp. 502-509, 2016. 9 Pages. DOI: 10.1002/adma.201504441.

Trung, TQ., et al., "Flexible and Stretchable Physical Sensor Integrated Platforms for Wearable Human Activity Monitoring and Personal Healthcare", Advanced Materials, vol. 28, No. 22, pp. 4338-4372, 2016. 36 Pages.

Walker, C.W., et al., "Improvementof Ionic Conductivity in Plasticized PEO-Based Solid Polymer Electrolytes", J. Electrochem. Soc., vol. 140, No. 12, Dec. 1993. pp. 3409-3412. 6 Pages.

Yu, C., et al., "A stretchable temperature sensor based on elastically buckled thin film devices on elastomeric substrates", Applied Physics Letters, vol. 95, No. 141912, Oct. 8, 2009. 5 Pages DOI: 10.1063/1.3243692.

\* cited by examiner

GEL AND POLYMER BASED FLOW METERS

CROSS REFERENCE TO RELATED APPLICATIONS

The present application claims priority to U.S. Provisional Patent Application No. 62/667,742, filed on May 7, 2018, the disclosure of which is incorporated herein by reference in its entirety.

TECHNICAL FIELD

The present disclosure relates to flow meters. More particularly, it relates to gel and polymer based flow meters.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

In a first aspect of the disclosure, a method is described, the method comprising: at least one heater layer; at least one first thermometer layer; at least one second thermometer layer; and at least one thermal insulator layer between the first thermometer layer and the second thermometer layer, wherein: the at least one first thermometer layer and the at least second thermometer layer are gel materials, the at least one first thermometer layer is thermally insulated from an environment surrounding the sensor, the at least one second thermometer layer is thermally accessible by the environment, and the at least one heater layer is configured to generate a constant heat flux through the at least one first thermometer layer, the at least one thermal insulator layer, and the at least one second thermometer layer, thus generating a thermal gradient within the at least one thermal insulator.

DETAILED DESCRIPTION

The present disclosure describes flow meters based on gel or polymers, for example for aerodynamics applications. Aerodynamics measurements and wind tunnel experiments are of great importance in engineering: experiments carried out in wind tunnels allow investigation of the complex phenomena developing due to fluid-bodies and fluid-fluid interactions, while also enabling validation of computational fluid dynamics (CFD) code. The main aim of a wind tunnel experiment is often to acquire the pressure and velocity distribution around scaled-down models of structures of interest. Using this data, it is then possible to compute the forces acting on the body subject of the experiment, e.g. the drag force acting on a car, or the lift force generated by a wing.

Measuring techniques typically employed for aerodynamics measurements focus on pressure distributions or fluid velocities. For example, one technique referred to as a pressure tap is based on a Pitot tube used to measure static and dynamic pressure at a single point. Pressure taps and pressure sensitive paints are based on pressure distributions, while laser Doppler velocimetry is based on fluid velocities. Several of these sensors are typically attached to surfaces of interest of models tested in wind tunnels. In post processing, pressure distributions can be approximately reconstructed from the punctual pressure measurements.

Figure 5:
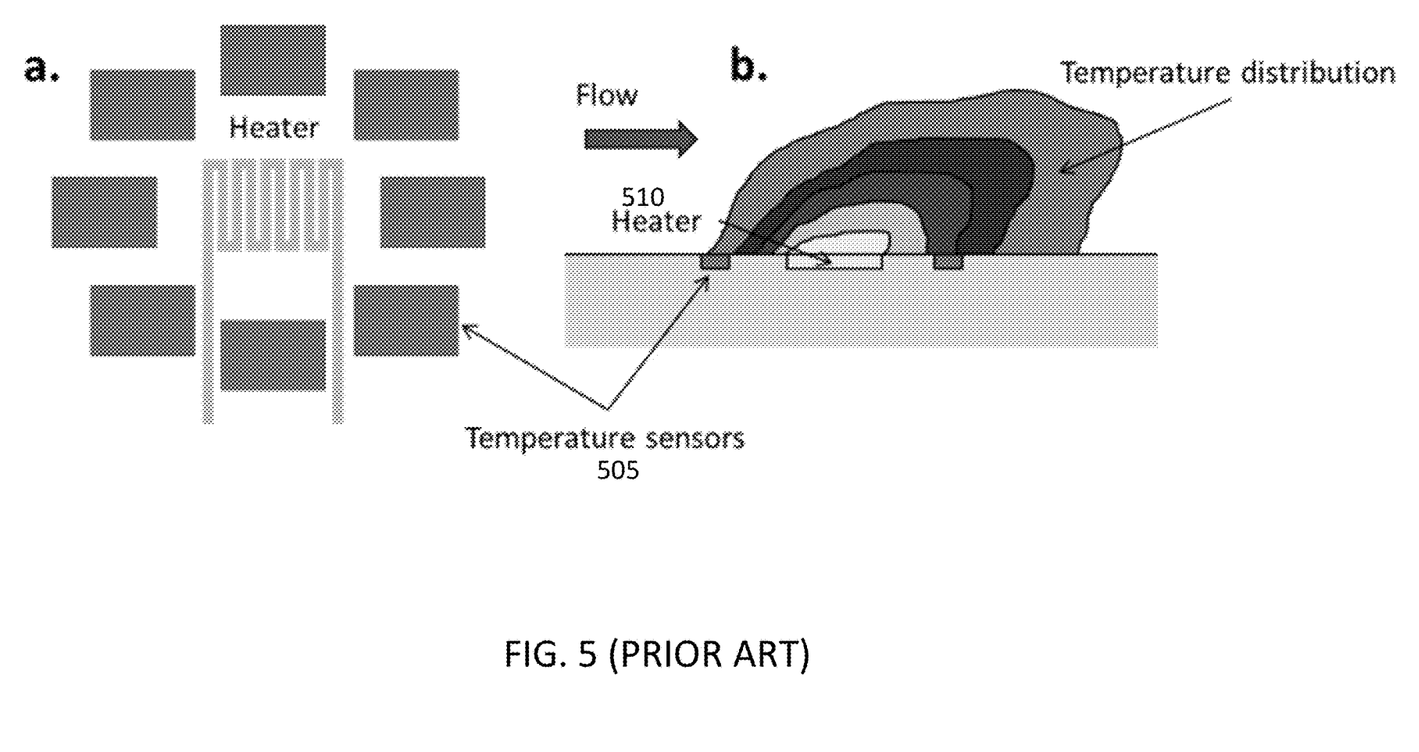
FIG. 5 illustrates a sensor.

Thermal flow meters can measure flow rate even at very low pressure, without affecting the flow. As illustrated in FIG. 5, the sensors combine one or more heating elements (510) and several temperature sensors (505) placed on the surface around the heater (FIG. 5 panel a). Heat is exchanged between the sensor and the fluid flowing at a temperature different from the heating element (FIG. 5, panel b). The flow rate is then determined by measuring the temperature distribution along the sensor created by the flowing fluid. In general, the temperature of the sensor cannot be raised arbitrarily, since high temperatures can be hazardous and can affect the flow. Therefore, the temperature gradient over the sensor is typically not particularly pronounced (the temperature variations are in the order of hundreds of milliKelvin). To achieve acceptable readings from these measurements, especially at low flow densities, commercially available devices are based on MEMS technology and on very accurate temperature sensors. Platinum is one of the most used thermistor, but it has a temperature sensitivity of about 0.4 $\Omega/°$ C. The maximum resistance variation of a thermistor in the considered temperature range for a thermal flow meter is of approximately milliOhms, which requires low-noise read-out electronics to be effectively measured. Furthermore, to optimize the temperature measurements, the thermistors are usually suspended. This requires a complicated fabrication process, which further raise the price for this type of sensors.

Pressure sensitive paints are a special class of paints which can react to pressure changes. These paints are generally composed of a porous polymeric matrix mixed with luminescent organic molecules. When using this technique, models are spray-coated with such paints before being placed in the wind tunnel. The model is illuminated by light of a specific wavelength, causing an electronic excitation in the luminescent molecule. The wavelength is based on the specific luminophore incorporated into the paint. The return to electronic ground state of the luminophore can be attained by either a radiative process, or a radiationless process. In the former case, the relaxation results in photonic emission, while in the latter, interaction with oxygen molecules results in the electron returning to its ground state without photonic emission, a process known as oxygen quenching of luminescence. A pressure sensitive paint is thus, in fact, an oxygen sensor. As the local oxygen (partial) pressure increases, so does the local oxygen concentration, resulting in stronger luminescence quenching. The net effect is a paint whose luminescence decreases as pressure increases. The re-emitted light is finally detected using a camera and, after calibration, the pressure distribution can be computed with virtually unlimited spatial resolution. Notable disadvantages of pressures sensitive paints are the rather long preparation time (deposition and curing time of the paints), and the relatively high velocity range at which they operate (Ma>0.3). Pressure sensitive paints are only suited for use in air flows, as their functioning mechanism relies on the oxygen contained in the gas flow.

Laser Doppler velocimetry is a measuring technique that exploits light scattering due to particles either naturally occurring, or induced, in the flow. Particles moving with the fluid are illuminated with a split laser beam. The shift in frequency between scattered and incident light is proportional to the velocity of the scattering particles, due to the Doppler effect.

The present disclosure describes sensors to perform measurements based on thermal effects, convection in particular. Convection is one of the three heat transfer mechanisms, being the one prevailing in fluids. The convective heat transfer law states that a surface immersed in a moving fluid experiences a heat flux proportional to the temperature difference existing between the surface itself and the fluid, i.e.:

$$\dot{q}''=\alpha \cdot (T-T_\infty)$$

where: $\dot{q}''$ is the convective heat flux per unit area leaving the surface in $Wm^{-2}$, $\alpha$ is the convective heat transfer coefficient in $WK^{-1}m^{-2}$, T is the temperature of the surface in K, and $T_\infty$ is the temperature of the fluid in K. The heat transfer coefficient $\alpha$ is generally very difficult to compute, as it is dependent on many parameters including fluid properties (such as density and specific heat) and problem-specific geometry. In any case, though, a strong dependence of $\alpha$ on the fluid velocity can be observed. In other words, the faster the fluid moves over the surface, the higher the heat transfer coefficient $\alpha$.

This principle is exploited by hot-wire anemometers, i.e. a class of instruments capable of measuring free-stream air velocity (or wind speed, hence the name) based on the aforementioned principle. A hot-wire anemometer is composed of a metallic wire heated significantly above ambient temperature by resistive Joule effect. A feedback loop keeps the wire at a constant temperature by controlling the current through the wire. As the fluid moves around the wire, some of the generated heat is subtracted by convection, thus prompting a response by the feedback loop and an increased current. Since the magnitude of this effect holds a strong dependence on fluid velocity, a calibration procedure allows obtaining the free-stream speed as function of the control effort, that is the electric current in the wire. Hot-wire anemometers are used in free stream conditions, and by construction they offer a very limited spatial resolution. Therefore, their use in wind tunnel experiments is limited to the determination of the free-flowing air speed. A conformal heat-flux sensor, improving on the principle of a hot-wire anemometer with higher spatial resolution and attached on model surfaces in wind tunnel is an advantageous alternative to measure quantities of interest during experiments. The present disclosure describes how to design these conformal heat-flux sensors.

Figure 1:
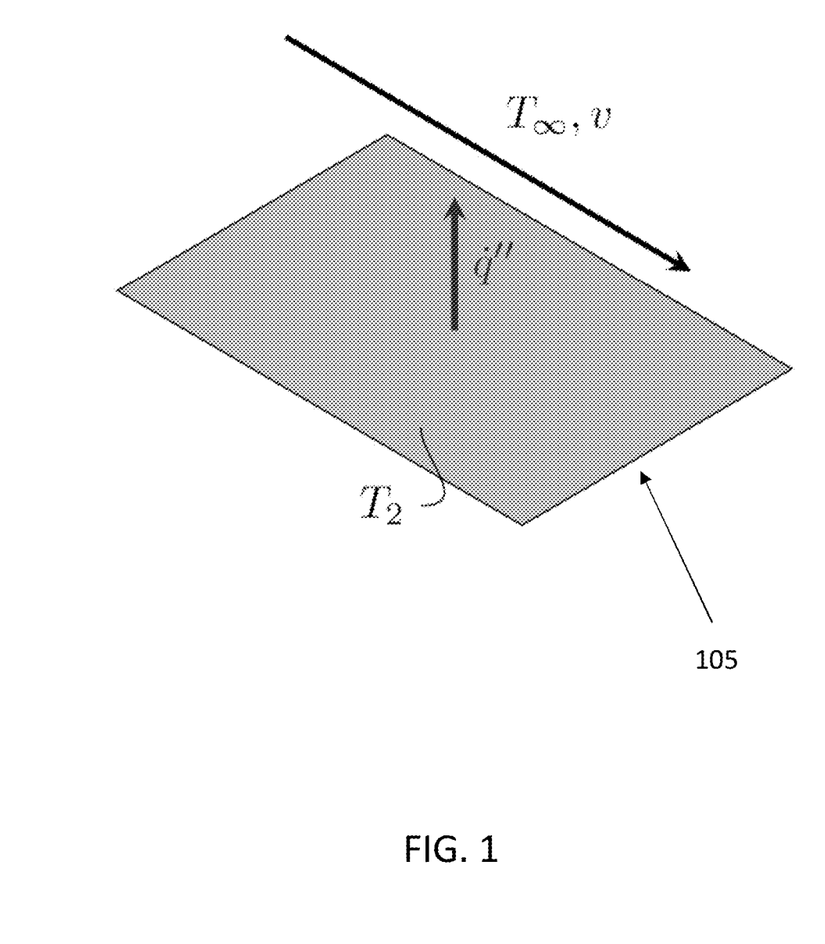
FIG. 1 illustrates convection for a surface.

With reference to FIG. 1, a surface (105) at a temperature $T_2$, immersed in a moving fluid, exchanges heat with the fluid at a rate depending on the fluid's temperature $T_\infty$, its velocity v, and a problem-specific coefficient $\alpha$, which is strongly dependent on the fluid's velocity v. In FIG. 1, the underlying physical phenomenon is described by the convection heat transfer law.

When the temperatures $T_\infty$ and $T_2$ are known, and the heat flux is known, it is possible to invert the convection law to obtain:

$$\alpha = \frac{\dot{q}''}{T_2 - T_\infty}$$

Figure 2:
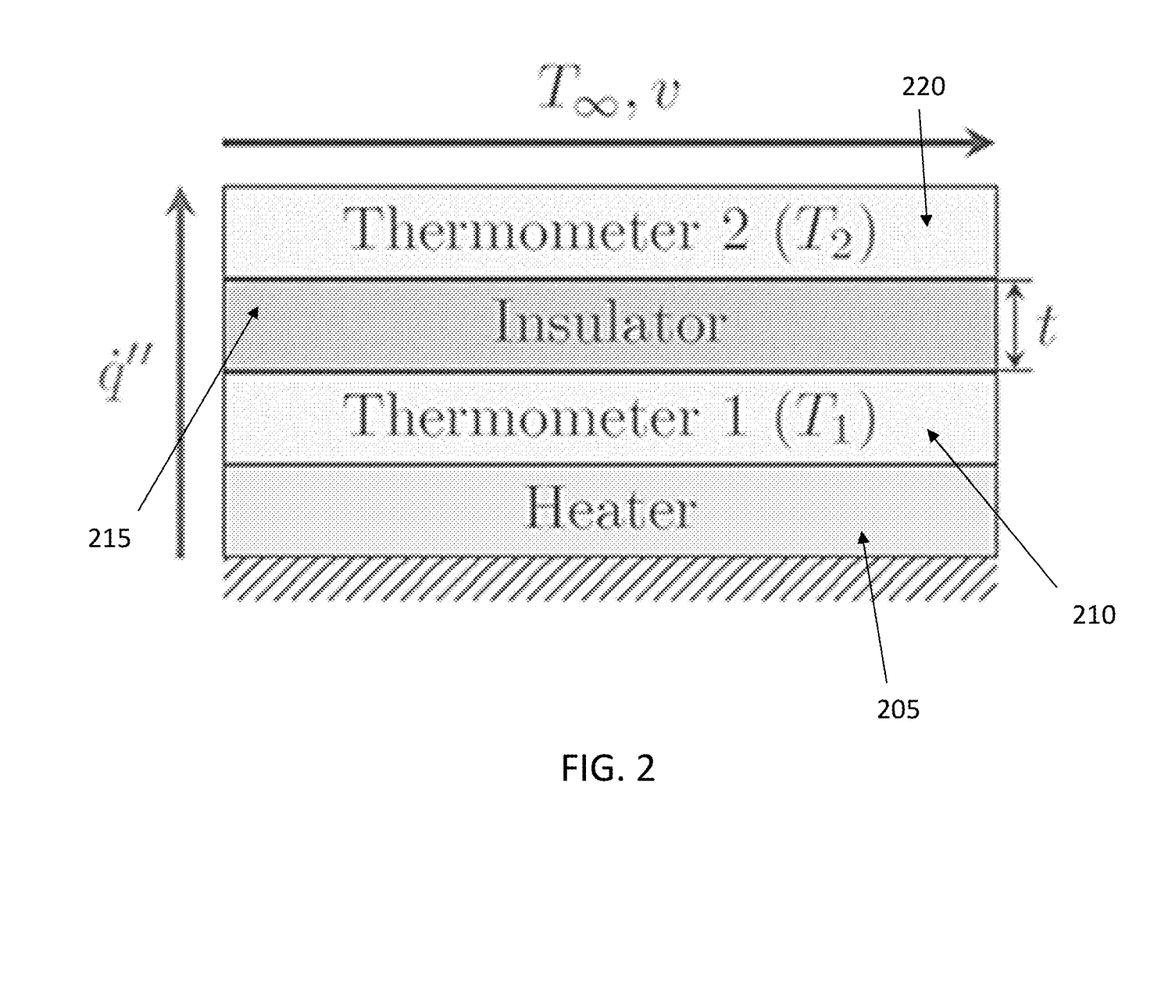
FIG. 2 illustrates an exemplary sensor.

Because of the strong dependence of $\alpha$ on the fluid's velocity, measuring a provides information on the fluid's velocity. The larger $\alpha$ is, the larger the flow speed. In some embodiments, as described in the present disclosure, a sensor can be fabricated based on the physics describing FIG. 1. A sensor, in some embodiments, comprises two thin thermometers separated by a thermal insulator. FIG. 2 illustrates an example of a sensor comprising a heater (205), a first thermometer (210), a thermal insulator (215), and a second thermometer (220).

The thermometers comprise a temperature sensitive material, such as a gel or a polymer. One surface of the sensor is insulated, whereas the opposite surface is exposed to the moving fluid, and is thus able to exchange heat therewith. A heater imposes a constant heat flux through the device, building a temperature gradient within the insulator. The temperature gradient is measured using the first and second thermometers, thus allowing the computation of the convective heat-transfer coefficient $\alpha$. The larger the temperature difference between the temperatures of the first and second thermometers, $T_1$ and $T_2$, the larger $\alpha$, and thus the larger the flow speed. The convective coefficient $\alpha$ can be calculated as:

$$\alpha = -\frac{k(T_2 - T_1)}{t(T_2 - T_\infty)}$$

where: k is the thermal conductivity of the insulator; $T_1$, $T_2$ are, respectively, the temperatures of the two thermometers on either side of the insulator; $T_\infty$ is the temperature of the fluid, and t is the thickness of the insulating layer. In some embodiments, a different arrangement or number of layers may be used, based on at least an insulating layer between two thermometers, and a heater. In some embodiments, the sensors can comprise several thermometer layers, and several heating or cooling layers. The sensors can comprise thin electrical heaters, resistive heaters, polyimide foil heaters, an electrical circuit heating by Joule effect, or a Peltier element. The sensor may also comprise a heater or cooling layer that incorporates a microfluidic circuit or channel. One of the thermometer layers is thermally accessible by the environment.

Figure 3:
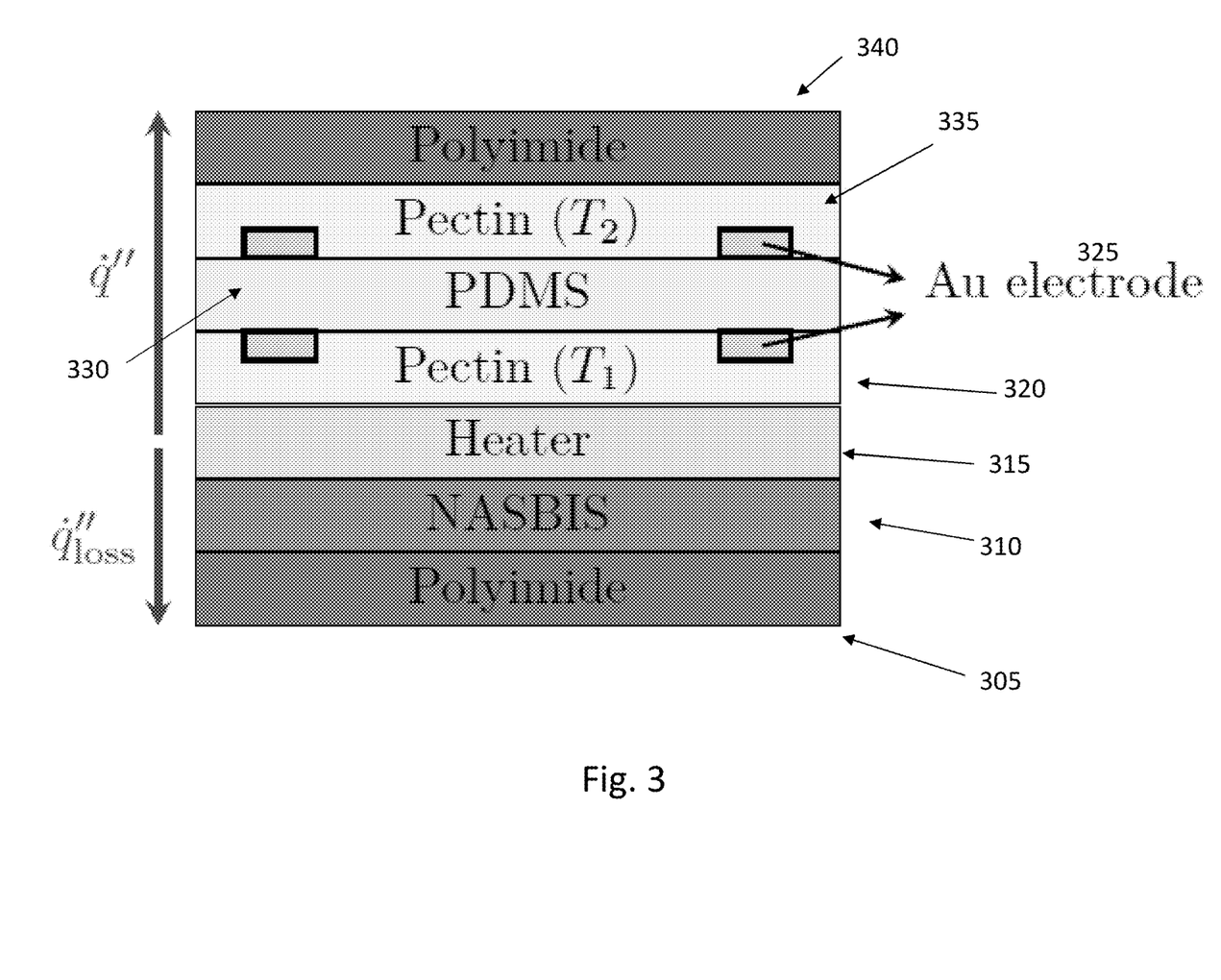
FIG. 3 illustrates an exemplary cross section of a device based on pectin cross-linked by calcium ions as a temperature sensitive layer.

FIG. 3 illustrates an exemplary cross section of a device based on pectin cross-linked by calcium ions as a temperature sensitive layer (a thermometer). In the embodiment of FIG. 3, the sensor comprises a polyimide layer (305), a thermal insulator layer (310), a heater (315), a thermometer based on pectin (320), a thermal insulator (330), a thermometer based on pectin (335), and a polyimide layer (340). In this embodiment, pectin is used for temperature sensing, however other materials may be used instead. In this example, the insulator (310) comprises NASBIS® (NAno Silica Ball InSulator), a flexible, thermally insulating material. In this embodiment, the insulator (330) comprises a polydimethylsiloxane (PDMS). Gold electrodes (325) can be used for the two pectin thermometers.

Figure 4:
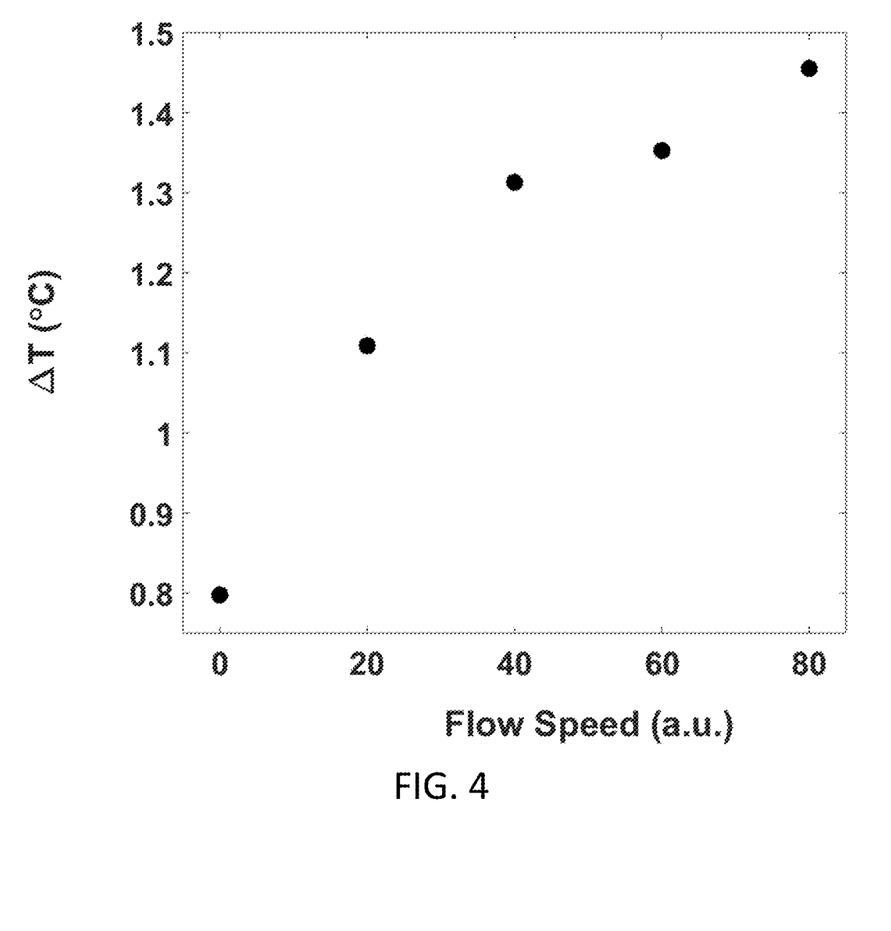
FIG. 4 illustrates exemplary data for the temperature difference between the two thermometers in a sensor.

FIG. 4 illustrates exemplary data for the temperature difference between the two thermometers, which are at temperatures $T_1$ and $T_2$, as a function of the flow speed. A larger difference between $T_1$ and $T_2$ corresponds to a larger flow speed. The device can be calibrated to provide the actual flow speed calculated from the temperature difference. The sensor can be designed as an array of similar pixels to provide a spatial map of the flow's speed. Several sensors can be applied on a model surface to measure the flow speed at different location, thus realizing a conformal sensor array. The sensor can be fabricated from flexible materials, and can therefore be conformally attached to curved surfaces.

As described above, the present disclosure combines a thin heater with a class of organic, temperature-sensitive materials, which show a high resistance versus temperature response. The thin heater serves as a heat source, while the temperature sensitive material, deposited as a thin film or as an array of sensors, provides the temperature feedback. In some embodiments, the sensors of the present disclosure are based on organic bio-molecules, such as pectin, alginate, chitosan or a combination of these. Pectin-based thin films as described above are very responsive to temperature. Pectin is made of structurally and functionally very complex, acid-rich polysaccharides. In low-ester pectin, ionic bridges are formed, at near neutral pH, between $Ca^{2+}$ ions and the ionized carboxyl groups of the galacturonic acid present in the molecule, forming an "egg box" structure in which cations are stored. Because the cross-linking between pectin molecules decreases exponentially with temperature, increasing the temperature of a $Ca^{2+}$-cross-linked pectin results in a dramatic increase of ionic conduction. $Ca^{2+}$-cross-linked pectin can be deposited on flexible substrate. The resulting ultrathin membranes (20-200 μm thin) show a variation in their resistance of two order of magnitudes over 45° C. As a comparison, a standard platinum thermistor (Pt100), varies its resistance by only about 1.5 times over the same interval. Besides possessing an extreme temperature responsivity, these pectin films have a very high signal-to-noise ratio and can sense temperature variation of at least 10 mK. Pectin layers can also be produced on extended areas, and can monitor 2D temperature distributions thanks to their extraordinary responsivity and sensitivity. These advantages allow collecting flow information on extended areas, instead of the localized data provided by standard flow meters.

In some embodiments, the pectin films can be crosslinked by Ca, Cu, or Mg. Instead of pectin, other materials may be used, for example alginate crosslinked by Ca, Cu, or Mg. In some embodiments, the sensors can be based on specific materials. The present disclosure describes some exemplary materials in the following. These materials can also be used for purposes other than flow sensors. Therefore, the materials in the following are described both for use in flow sensors, and for use unrelated to flow sensors. The present disclosure therefore describes, in some embodiments, a flow meter comprising one or more hydrogel-based temperature sensors, and one or more heating (or cooling) elements. For example, a sensor can comprise, as described above, a resistive heater coupled with two local pectin-based temperature sensors.

As known to the person of ordinary skill in the art, pectin, a component of all higher plant cell walls, is made of structurally and functionally very complex, acid-rich polysaccharides. Pectin plays several roles in plants—for example, it is an essential structural component of cell walls and binds ions and enzymes. In high-ester pectins, at acidic pH, individual pectin chains are linked together by hydrogen bonds and hydrophobic interactions. In contrast, in low-ester pectins, ionic bridges are formed, at near neutral pH, between $Ca^{2+}$ ions and the ionized carboxyl groups of the galacturonic acid, forming an "egg box" in which cations are stored. Since the crosslinking between pectin molecules decreases exponentially with temperature, increasing the temperature of a $Ca^{2+}$-crosslinked pectin increases ionic conduction.

Currently, the potential applications of pectin gels as temperature-sensing elements in mobile phones and automotive applications are challenged by several factors. First, the temperature responsivity and conductivity of hydrogel-based pectin are both highly dependent on the water content of the membrane, whereas the water content is subjected to fluctuations in ambient humidity and temperature. Secondly, being a water-based gel, the applicable temperature range of a pectin gel is limited. The increased evaporation of water at higher temperatures also renders the membrane unstable at higher temperature ranges (>70° C.). Further, due to the intrinsic rigidity of pectin's molecular structure, the flexibility of pectin membranes is dependent on their water content. Excessively reducing the pectin water content results in shrinkage of the pectin membranes, detachment of the membrane from electrodes, and increased brittleness of the membrane.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A sensor comprising:
   at least one heater layer;
   at least one first thermometer layer;
   at least one second thermometer layer; and
   at least one thermal insulator layer between the at least one first thermometer layer and the at least one second thermometer layer,
   wherein:
   the at least one first thermometer layer and the at least one second thermometer layer comprise temperature sensitive materials,
   the at least one first thermometer layer is thermally insulated from an environment surrounding the sensor,
   a top surface of at least one second thermometer layer is thermally accessible by the environment by either a direct thermal coupling to the environment or a direct thermal coupling to a polyimide layer, and
   the at least one heater layer is configured to generate a constant heat flux through the at least one first thermometer layer, the at least one thermal insulator layer, and the at least one second thermometer layer, thus generating a thermal gradient within the at least one thermal insulator;

wherein the sensor is configured to measure a temperature gradient using the at least one first thermometer layer and the at least one second thermometer layer allowing for a computation of a heat-transfer coefficient.

2. The sensor of claim 1, wherein the at least one heater layer is selected from the group consisting of: an electrical heater, a resistive heater, a polyimide foil heater, an electrical circuit heating by Joule effect, and a Peltier element.

3. The sensor of claim 1, wherein the at least one first thermometer layer and the at least one second thermometer layer are selected from the group consisting of: pectin, alginate, chitosan, and any combination thereof.

4. The sensor of claim 3, wherein the at least one first thermometer layer or the at least one second thermometer layer comprise pectin and $Ca^{2+}$.

5. The sensor of claim 1, wherein the at least one thermal insulator is made of polydimethylsiloxane.

6. The sensor of claim 1, wherein the at least one heater layer, the at least one first thermometer layer, the at least one second thermometer layer, and the at least one thermal insulator are flexible layers.

7. The sensor of claim 1, wherein the temperature sensitive material is a gel.

8. The sensor of claim 1, wherein the temperature sensitive material is a polymer.

9. The sensor of claim 1, further comprising electrodes in each of the at least one first thermomter layer and the at least one second thermometer layer.

10. The sensor of claim 9, wherein the electrodes comprise gold.

* * * * *